United States Patent
Buck et al.

(10) Patent No.: US 8,762,483 B2
(45) Date of Patent: Jun. 24, 2014

(54) SYSTEM FOR AND METHOD OF VERIFYING PACKAGES

(75) Inventors: Teril J. Buck, St. Peters, MO (US); Kevin R. Garrison, Wesley Chapel, FL (US); Robert P. Kilgore, Carrbelle, FL (US); James Lamantia, Riverside, IL (US); Mary Senica, Cedar Rapids, IA (US); Ovid Lane Hunt, Salsbury Mills, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 572 days.

(21) Appl. No.: 12/868,431

(22) Filed: Aug. 25, 2010

(65) Prior Publication Data

US 2012/0054299 A1 Mar. 1, 2012

(51) Int. Cl.
*G06F 11/00* (2006.01)
*G06F 21/56* (2013.01)

(52) U.S. Cl.
CPC .................................. *G06F 21/565* (2013.01)
USPC .................. 709/217; 726/22; 726/23; 726/24

(58) Field of Classification Search
None
See application file for complete search history.

(56) References Cited

U.S. PATENT DOCUMENTS

| | | | |
|---|---|---|---|
| 2005/0033728 A1* | 2/2005 | James et al. | 707/1 |
| 2005/0251431 A1* | 11/2005 | Schmidtberg | 705/6 |
| 2006/0282440 A1* | 12/2006 | Fletcher et al. | 707/100 |
| 2007/0101146 A1* | 5/2007 | Louch et al. | 713/176 |
| 2007/0162541 A1* | 7/2007 | Dhawan et al. | 709/203 |
| 2007/0180490 A1* | 8/2007 | Renzi et al. | 726/1 |
| 2008/0076401 A1* | 3/2008 | Zeilingold et al. | 455/418 |
| 2008/0141371 A1* | 6/2008 | Bradicich et al. | 726/23 |
| 2008/0281979 A1* | 11/2008 | Keeler | 709/233 |
| 2008/0301796 A1* | 12/2008 | Holostov et al. | 726/12 |
| 2012/0260099 A1* | 10/2012 | Brouwer et al. | 713/176 |

OTHER PUBLICATIONS

Enck, William, Machigar Ongtang, and Patrick McDaniel. "On lightweight mobile phone application certification." In Proceedings of the 16th ACM conference on Computer and communications security, pp. 235-245. ACM, 2009.*

* cited by examiner

*Primary Examiner* — Jeffrey Pwu
*Assistant Examiner* — Carlos Amorin

(57) ABSTRACT

The system and method may include identifying manifest data associated with a package to be developed on a package development system, receiving the package from the package development system via a first network, comparing the manifest data to the package to determine whether a code injection exists in the package, and distributing the package to a plurality of user systems via a second network based on a determination that the code injection does not exist in the package.

17 Claims, 5 Drawing Sheets

Verification Tool

Select Method:
- ○ Marimba  ○ LAN Desk  ○ SMS  ○ Other

Select Files to Compare:
- ○ select all
- ○ Text     ○ script
- ○ Exe      ○ registry
- ○ image    ○ Other Path to application manifest: [_____] [Browse]

Path to package output log: [_____] [Browse]

[Launch Scan]

Output Display: [_____]

[Export Data]

Fig. 3

SYSTEM FOR AND METHOD OF VERIFYING PACKAGES

BACKGROUND INFORMATION

In general, business organizations may increasingly develop software packages (e.g., a collection of software applications) at remote developing sites. In some instances, these business organizations instruct the remote developing sites to develop software packages that are designed to perform particular tasks and in accordance with particular sets of requirements. Verifying that the software packages are properly developed to perform the particular tasks and are in accordance with the proper set of requirements may be very time consuming.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 3 illustrates an exemplary screen for initiating a verification process according to a particular embodiment;

DETAILED DESCRIPTION OF PREFERRED EMBODIMENTS

Figure 1:
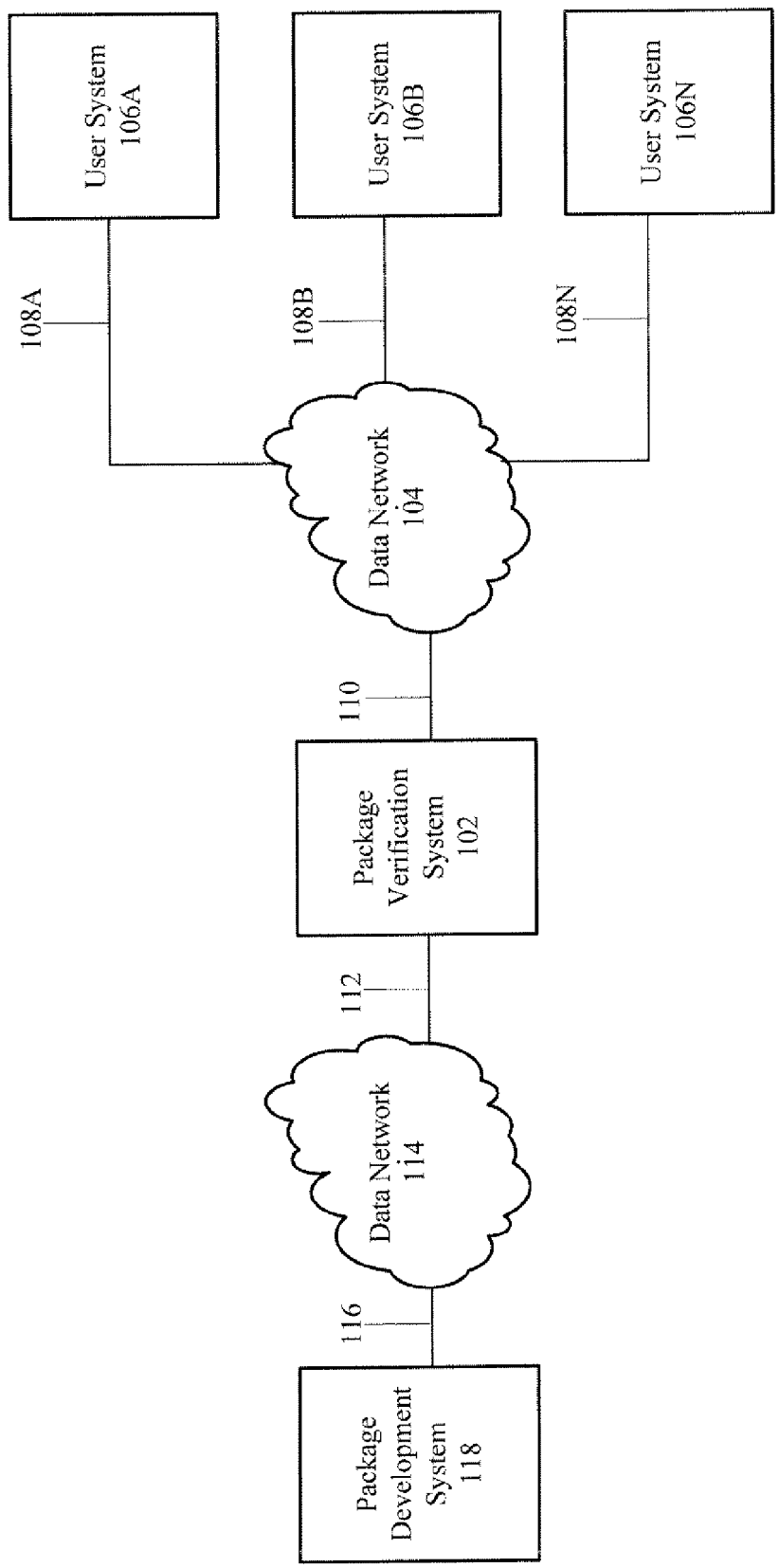
FIG. 1 is a schematic diagram illustrating a verification system according to a particular embodiment.

A software package may include a collection of software applications that is stored on a server and distributed to user systems (e.g., client computers) communicatively coupled to a network. Each software package may also include any, or a combination, of documents, document keys, scripts, files, pointers, and images used to support the installation or execution of the software package on a user system. A user of a user system may subscribe to a particular software package stored on the server to access the software package at the user system. Once a user system is subscribed to a particular software package, the user system may automatically receive updates associated with the software package as updates become available.

An organization (e.g., a business organization, an educational institution, a government entity) may develop such a software package using a package development system at a remote developing site that is associated with the organization. In some embodiments, the package development system may have limited access to the server, the user systems, or both. In such embodiments, the package development system may access a limited amount of storage locations (e.g., folders, databases, environments) associated with the server and may not access the user systems. In other embodiments, the package development system may have unlimited access to the server, the user systems, or both.

An administrator (or an administrator system) may instruct a developer associated with the package development system to develop a software package (e.g., a new software package, an update of a previously developed software package, a new version of a software package) by providing the package development system and the developer with manifest data (e.g., a manifest file). Manifest data may indicate a set of requirements a developer needs to meet while developing the software package on the package development system. Once developed and prior to distribution, a software package may go through a verification process to ensure that the software package meets the set of requirements provided in the manifest data and does not include any code injections (e.g., additional code that was not authorized by the manifest data, malicious code).

A verification system that is configured to execute the verification process on each developed software package may communicatively couple a package development system, a package verification system, and a plurality of user systems via data networks. In one embodiment, the verification process may include comparing the manifest data to the developed software package to determine whether code injections exist in the developed software package. In another embodiment, the verification process may include comparing the manifest data to the developed software package to determine whether the developed software package meets the set of requirements provided in the manifest data. In another embodiment, the verification process may include comparing a time stamp associated with the manifest data to a time stamp associated with the developed software package.

In certain embodiments, a combination of comparisons that are to be executed in a verification process may be selected based on a level of risk (e.g., a level of risk related to the importance of the software package to the organization, a level of risk related to the amount of user systems subscribed to the software package, a level of risk related to the type of users associated with the user systems subscribed to the software package, a level of risk related to the type of user systems subscribed to the software package) associated with a software package. In other embodiments, the combination of comparisons may be selected in accordance with design preferences.

FIG. 1 is a schematic diagram illustrating a verification system according to a particular embodiment. A verification system 100 may communicatively couple together any, or a combination, of a package development system 118, a package verification system 102, and user systems 106A, 106B, 106N, using any, or a combination, of data networks 104, 114 and data paths 108A, 108B, 108N, 110, 112, 116. Accordingly, data signals may be transmitted to any of the components of the verification system 100 and transmitted from any of the components of the verification system 100 using any, or a combination, of data networks 104, 114 and data paths 108A, 108B, 108N, 110, 112, 116. For example, manifest data signals, software package data signals, or any other data signals may be transmitted to any of the components of the verification system 100 and transmitted from any of the components of the verification system 100 using any, or a combination, of data networks 104, 114 and data paths 108A, 108B, 108N, 110, 112, 116.

Data networks 104, 114 may be a wireless network, a wired network, or any combination of wireless network and wired network. For example, data networks 104, 114 may include one or more of a fiber optics network, a passive optical network, a cable network, an Internet network, a public network, a private network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, data networks 104, 114 may include, without limitation, a telephone line, fiber optics, IEEE Ethernet 802.3, a wide area network (WAN), a LAN, or a global network, such as the Internet. Also, data networks 104, 114 may support, an Internet network, a wireless communication network, a cellular network, or the like, or any combination thereof. Data networks 104, 114 may further include one, or any number of the exemplary types of networks mentioned above operating as a stand-alone network or in cooperation with each other. Data networks 104, 114 may utilize one or more protocols of one or more network elements to which it is communicatively coupled. Data networks 104, 114 may translate to or from other protocols to one or more protocols of network devices. Although data networks 104, 114 is depicted as one network, it should be appreciated that according to one or more embodiments, data networks 104, 114 may comprise a plurality of interconnected networks, such as, for example, a service provider network, the Internet, a broadcaster's network, a cable television network, corporate networks, and home networks.

Package development system 118, package verification system 102, and user systems 106A, 106B, 106N may transmit data to and receive data from data networks 104, 114 representing manifest data, software package data, and other data. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection. Data networks 104, 114 may use standard wireless protocols including IEEE 802.11a, 802.11b and 802.11g. Data networks 104, 114 may also use protocols for a wired connection, such as an IEEE Ethernet 802.3.

User systems 106A, 106B, 106N may be communicatively coupled to data network 104 via data paths 108A, 108B, 108N, respectively. The user systems 106A, 10613, 106N may include, but are not limited to, computer devices or communications devices including, e.g., a personal computer (PC), a workstation, a PDA, a mobile device, a handheld PC, a thin system, a fat system, a network appliance, a lap top device, a set top box, a VoIP device, a client system, an end-user system, or any other device that is configured to receive software package data.

Package development system 118 may be communicatively coupled to data network 114 via data path 116. The package development system 118 may include, but are not limited to, computer devices or communications devices including, e.g., a personal computer (PC), a workstation, a PDA, a mobile device, a handheld PC, a thin system, a fat system, a network appliance, a lap top device, a set top box, a VoIP device, a client system, an end-user system, or any other device that is configured to receive manifest data, generate software packages based on the manifest data, and transmit software package data.

Package verification system 102 may be communicatively coupled to data network 104 via data path 110 and data network 114 via data path 112. The package verification system 102 may include, but is not limited to, a computer device or communications device including, e.g., a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to store manifest data associated with a software package that is to be developed, receive software package data, perform a verification process on received software package data, and transmit (e.g., distribute) verified software package data to user systems. Details of the package verification system 102 are provided below.

Data paths disclosed herein may include any device that communicatively couples one or more devices to each other. For example, data paths may include one or more networks (e.g., a wireless network, a LAN) or one or more conductive wires (e.g., copper wires).

Figure 2:
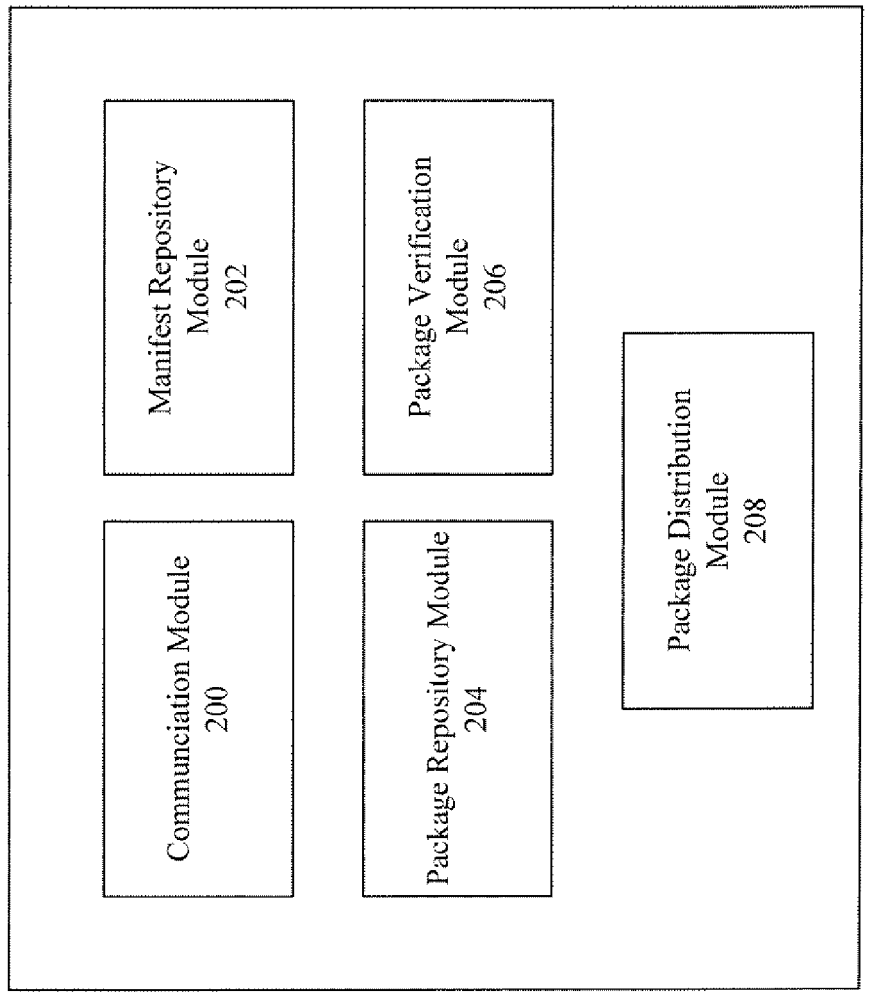
FIG. 2 is a schematic diagram of hardware components of a package verification system of a particular embodiment.

FIG. 2 is a schematic diagram of hardware components of a package verification system of a particular embodiment. The package verification system 102 may include a communication module 200, a manifest repository module 202, a package repository module 204, a package verification module 206, and a package distribution module 208. It is noted that the modules 200, 202, 204, 206, and 208 are exemplary. The functions of the modules 200, 202, 204, 206, and 208, may be performed at other modules remote or local to the package verification system 102, and the modules 200, 202, 204, 206, and 208 may be combined or separated.

The communication module 200 may include computer-implemented software, hardware, or a combination of both, configured to provide communication between the package verification system 102 and user systems 106A, 106B, 106N via data path 110 and between the package verification system 102 and the package development system 118 via data path 112. In one embodiment, the communication module 200 may be configured to receive or transmit data signals to and from one or more components of the verification system 100. In another embodiment, the communication module 200 may be configured to transmit the data signals or messages received from other components in the verification system 100 to the other modules 202, 204, 206, and 208 and may communicate data signals or messages received from the other modules 202, 204, 206, and 208 to other components in the verification system 100. The communication module 200 may be configured to transmit data signals and messages between the modules 202, 204, 206, and 208 of the package verification system 102.

The manifest repository module 202 may include computer-implemented software, hardware, or a combination of both, configured to store manifest data (e.g., a manifest file) associated with a software package to be developed by a developer using the package development system 118. The term "manifest data" may encompass any data that is used to support the development of a software package. For example, manifest data may include a set of requirements a developer needs to meet while developing a software package. In another example, manifest data may include a list of files to be generated during the development of a software package. In yet another example, manifest data may include a file size associated with a software package to be developed. In yet another example, manifest data may include a time stamp (e.g., a time stamp indicating the approximate time manifest data was submitted to or received at the manifest repository module 202) associated with a software package to be developed.

An administrator (or an administrator system) associated with the package verification system 102 may submit manifest data associated with a software package to be developed to the manifest repository module 202. In response to the submission of manifest data, the manifest repository module 202 may generate and transmit an initial alert that indicates the submission of the manifest data to the package development system 118. If, after a predetermined period of time, the manifest data is not accessed, the manifest repository module 202 may generate and transmit additional alerts that indicate the submission of the manifest data to any, or a combination, of the package development system 118 and the administrator (or administrator system).

The period of time before an initial alert is transmitted, the period of time before additional alerts are transmitted, and the period of time between the transmission of additional alerts may be configured in accordance with design preferences. For example, an initial alert may be configured to be transmitted immediately after (e.g., approximately immediately after) the manifest data is submitted to the manifest repository module 202. In another example, additional alerts may be configured to start being transmitted one (1) day after the initial alert. In yet another example, the additional alerts may be configured to be transmitted every eight (8) hours.

The manifest repository module 202 may be configured to allow the package development system 118 to access the stored manifest data. In one embodiment, the manifest repository module 202 may allow the package develop system 118 to have read-only access to the stored manifest data. The approximate time at which the manifest data is accessed by the package development system 118 may also be stored in the manifest repository module 202.

The package repository module 204 may include computer-implemented software, hardware, or a combination of both, configured to receive and store software packages developed in accordance with corresponding manifest data. In one embodiment, the package repository module 204 may receive software packages from the package development system 118.

A developer associated with the package development system 118 may submit one or more developed software packages to the package repository module 204. In response to the submission of a developed software package, the packaged repository module 204 may generate and transmit one or more alerts that indicates the submission of a developed software package to any, or a combination, of an administrator (or an administrator system) and the package verification module 206.

The package verification module 206 may include computer-implemented software, hardware, or a combination of both, configured to execute a verification process on each developed software package submitted to the package repository module 204. In one embodiment, a verification process may include comparing a developed software package to corresponding manifest data to determine whether a code injection exists in the developed software package. A code injection may include additional code that was not authorized by the manifest data, malicious code (e.g., any code that is intended to cause undesired effects), or a combination of both. For example, the package verification module 206 may compare the manifest data to the data of the developed software package to determine if any code injections exist in the developed software package. In another example, the package verification module 206 may perform the reverse and compare the data of the developed software package to the manifest data to determine if any code injections exist in the developed software package. If, for example, a code injection exists in the developed software package, the package verification module 206 may not verify the developed software package. If, however, a code injection does not exist in the developed software package, the package verification module 206 may transmit the developed software package to the package distribution module 208 for distribution to user systems.

In another embodiment, a verification process may include comparing a developed software package to corresponding manifest data to determine whether the developed software package meets a set of requirements provided in the manifest data. For example, the manifest data may indicate one or more files that should be generated during the development of the software package. As a result, the package verification module 206 may compare the one or more files provided in the manifest data to a log (e.g., a list of files present in the a software package) associated with the developed software package. If, for example, the developed software package does not meet a corresponding set of requirements, the package verification module 206 may not verify the developed software package. If, however, the developed software package does meet the corresponding set of requirements, the package verification module 206 may transmit the developed software package to the package distribution module 208 for distribution to user systems.

In another embodiment, a verification process may include comparing a time stamp associated with a developed software package to a time stamp associated with the corresponding manifest data. In such an embodiment, a verification rule may indicate that software packages that are not developed within a predetermined amount of time can not be verified. Accordingly, the package verification module 206 may compare a time stamp associated with the developed software package that indicates the time the package was submitted to the package repository module 204 to a time stamp associated with the manifest data that indicates the time the manifest data was accessed in the manifest repository module 202. If, for example, the magnitude of the difference between the time stamps is greater than the predetermined amount of time, the package verification module 206 may not verify the developed software package. If, however, the magnitude of the difference between the time stamps is less than or equal to the predetermined amount of time, the package verification module 206 may transmit the developed software package to the package distribution module 208 for distribution to user systems. The predetermined amount of time may be determined by implementers of the verification system 100 in accordance with design preferences.

In another embodiment, a verification process may include comparing a file size associated with a developed software package to a file size associated with the corresponding manifest data. For example, manifest data may indicate that a corresponding software package may be approximately 2 Megabytes. As a result, the package verification module 206 may compare the file size indicated in the manifest data (e.g., 2 Megabytes) to the file size of the developed software package. If, for example, the file size of the developed software package is not substantially equivalent to 2 Megabytes, the package verification module 206 may not verify the developed software package. If, however, the file size of the developed software package is substantially equivalent to 2 Megabytes, the package verification module 206 may transmit the developed software package to the package distribution module 208 for distribution to user systems. The amount of deviation from the file size indicated in the manifest data that is allowable to be considered substantially equivalent may be determined by implementers of the verification system 100 in accordance with design preferences.

In certain embodiments, a combination of comparisons that are to be executed by the package verification module 206 in a verification process may be selected based on a level of risk associated with a developed software package. In one embodiment, the level of risk associated with a developed software package may be related to the importance of the developed software package to the organization implementing the verification system 100. In another embodiment, the level of risk associated with a developed software package may be related to the amount of user systems subscribed to the developed software package. In another embodiment, the level of risk associated with a developed software package may be related to the type of users associated with the user systems subscribed to the developed software package. In another embodiment, the level of risk associated with a developed software package may be related to the type of user systems subscribed to the developed software package.

For example, the package verification module 206 may perform a requirements comparison, a file size comparison, and a code injection comparison on a developed software package that is subscribed to by a substantial number of user systems during a verification process. In another example, the package verification module 206 may perform a requirements comparison on a developed software package that is subscribed to by mail-room employees during a verification process. Accordingly, the amount of resources devoted to a verification process may change based on the combination of comparisons to be performed in the verification process.

The package distribution module 208 may include computer-implemented software, hardware, or a combination of both, configured to receive and distribute developed and verified software packages. In one embodiment, the package distribution module 208 may distribute developed and verified software packages to subscribing user systems via data network 104.

FIG. 3 illustrates an exemplary screen for initiating a verification process according to a particular embodiment. As illustrated in FIG. 3, a user may be allowed to initiate a verification process on a developed software package by inputting certain information into a "Verification Tool" graphical user interface.

In one embodiment, the user may input data (e.g., click a button) to select a type of developed software package to be verified. For example, a developed software package may include a software package created using Marimba developed by BMC Software, Inc. of Houston, Tex. In another example, a developed software package may include a software package created using LANDesk developed by LANDesk Software Inc. of South Jordan, Utah. In another example, a developed software package may include a software package created using the Systems Management Server (SMS) software developed by the Microsoft Corporation of Redmond, Wash. In yet another example, a developed software package may include a software package created using any software configured to create such packages.

In another embodiment, the user may input data (e.g., click a button) to select one or more types of files to compare during a verification process. For example, a user may select any, or a combination, of a text file, an executable file, an image file, a script file, a registry file, and any other file associated with a developed software package for comparison during a verification process.

In another embodiment, the user may input data (e.g., click buttons to drill down) to select manifest data and a corresponding software package to be compared (or verified). For example, the user may input data to indicate the location of the manifest data and the corresponding developed software package on a system. The user may then initiate a verification process by activating (e.g., clicking on) a button (e.g., a "Launch Scan" button). The output of the verification process may be displayed in an output display window of the Verification Tool graphical user interface.

Figure 4:
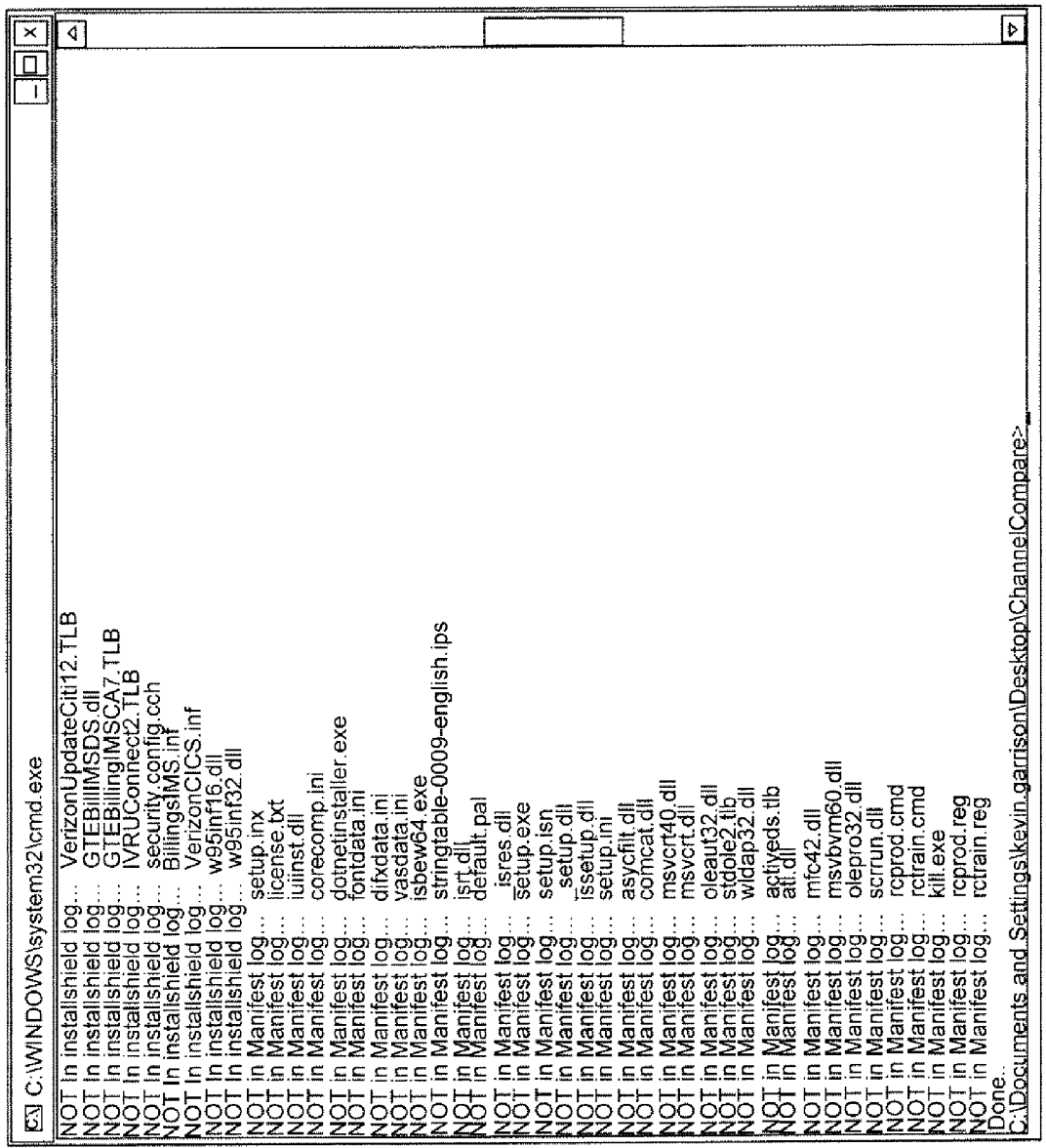
FIG. 4 illustrates an exemplary screen for outputting the result of a verification process according to a particular embodiment.

FIG. 4 illustrates an exemplary screen for outputting the result of a verification process according to a particular embodiment. As illustrated in FIG. 4, the output of a verification process may indicate a number of files that are not included in the manifest data (e.g., manifest log), but is included in the corresponding developed software package. Further, the output of a verification process may indicate a number of files that are not included in the developed software package (e.g., installshield log), but is included in the corresponding manifest data. Based on the output results, a package verification module 206 may determine whether a developed software package is verified or distributable.

Figure 5:
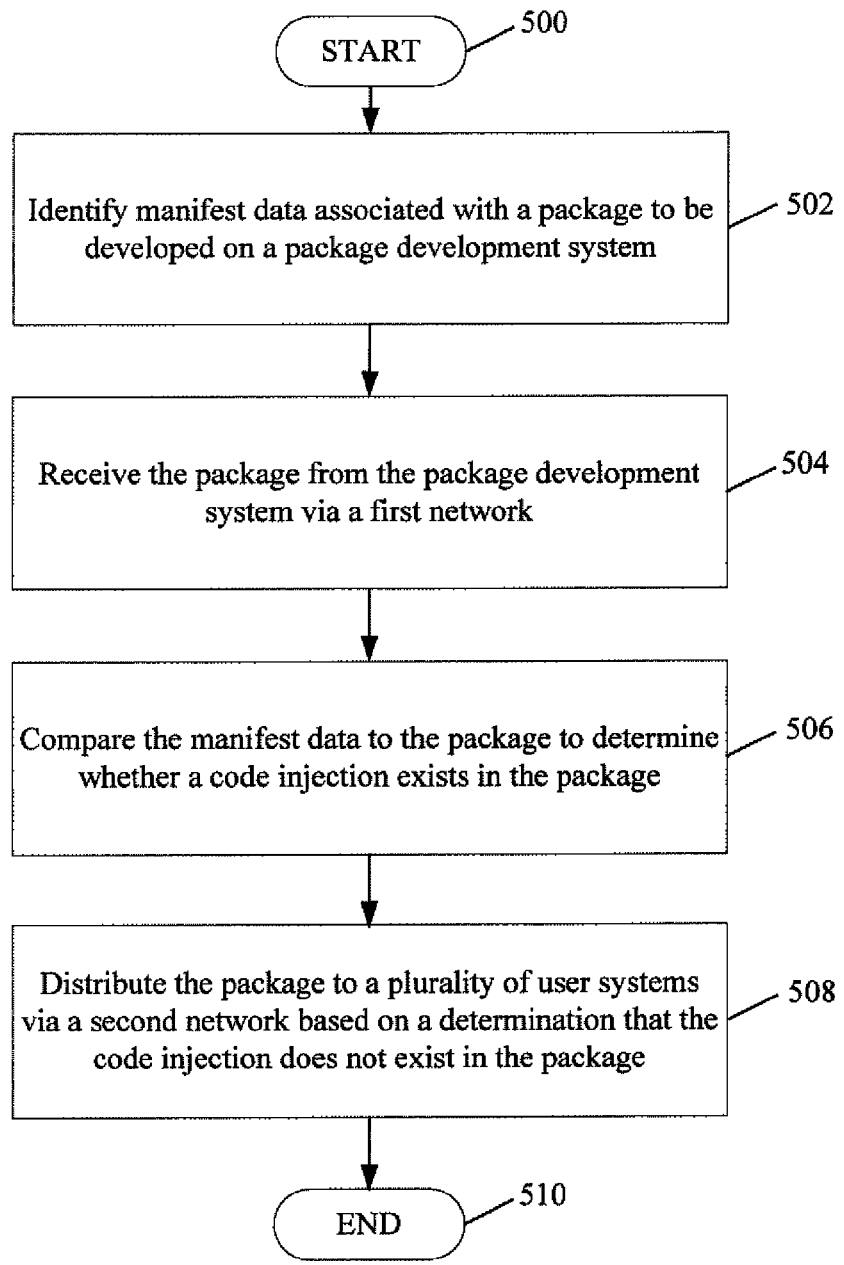
FIG. 5 is a flowchart illustrating the functionality of a particular embodiment.

FIG. 5 is a flowchart illustrating the functionality of a particular embodiment. This exemplary method is provided by way of example, as there are a variety of ways to carry out methods disclosed herein. The method shown in FIG. 5 may be executed or otherwise performed by one or a combination of various systems. The method is described below as carried out by the package verification system 102 shown in FIG. 1 by way of example, and various elements of the package verification system 102 are referenced in explaining the example method. Each block shown in FIG. 5 represents one or more processes, methods, or subroutines carried out in the exemplary method. Referring to FIG. 5, the exemplary method may begin at block 500.

In block 502, the method may include identifying manifest data associated with a package to be developed on a package development system. In one embodiment, the manifest repository module 202 of the package verification system 102 may identify manifest data associated with a package to be developed on a package development system (e.g., package development system 118). The method may continue to block 504.

In block 504, the method may include receiving the package from the package development system via a first network. In one embodiment, the package repository module 204 of the package verification system 102 may receive the package from the package development system (e.g., package development system 118) via a first network. The method may continue to block 506.

In block 506, the method may include comparing the manifest data to the package to determine whether a code injection exists in the package. In one embodiment, the package verification module 206 of the package verification system 102 may compare the manifest data to the package to determine whether a code injection exists in the package. The method may continue to block 508.

In block 508, the method may include distributing the package to a plurality of user systems via a second network based on a determination that the code injection does not exist in the package. In one embodiment, the package distribution module 208 may distribute the package to a plurality of user systems via a second network based on a determination that the code injection does not exist in the package. The method may then end at block 510.

The description above describes systems and networks that may include one or more modules, some of which are explicitly shown in the figures. As used herein, the term "module" may be understood to refer to any, or a combination, of computer executable computing software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein may be tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system comprising one or more network-enabled computers, said one or more network-enabled computers comprising:
    a manifest repository computing processor that identifies manifest data associated with an executable software package to be developed on a package development system;
    a package repository computing processor that receives the executable software package from the package development system via a first network;
    a package verification computing processor that compares the manifest data to the executable software package to determine whether a code injection exists in the package, wherein the package verification computing processor selects a combination of a plurality of comparisons based on a level of risk associated with at least one of the importance of the executable software package, an amount of user systems subscribed to the executable software package, and a type of user systems subscribed to the executable software package; and
    a package distribution computing processor that distributes the executable software package to a plurality of user systems via a second network based on a determination that the code injection does not exist in the executable software package.

2. The system of claim 1, wherein the first network and the second network are different.

3. The system of claim 1, wherein the package development system is not communicatively coupled to the second network.

4. The system of claim 1, wherein the manifest data includes a set of requirements a developer needs to meet while developing the package.

5. The system of claim 1, wherein the package verification computing processor also compares a first file size associated with the manifest data to a second file size associated with the package.

6. The system of claim 1, wherein the package verification computing processor also compares a first list of files associated with the manifest data to a second list of files associated with the package.

7. The system of claim 1, wherein the package verification computing processor also compares a first time stamp associated with the manifest data to a second time stamp associated with the package.

8. The system of claim 1, wherein the code injection comprises a malicious code injection.

9. A method, comprising:
    identifying manifest data associated with an executable software package to be developed on a package development system;
    receiving the executable software package from the package development system via a first network;
    comparing the manifest data to the executable software package to determine whether a code injection exists in the executable software package;
    selecting a combination of a plurality of comparisons based on a level of risk associated with at least one of the importance of the executable software package, an amount of user systems subscribed to the executable software package, and a type of user systems subscribed to the executable software package; and
    distributing the executable software package to a plurality of user systems via a second network based on a determination that the code injection does not exist in the executable software package.

10. The method of claim 9, wherein the first network and the second network are different.

11. The method of claim 9, wherein the package development system is not communicatively coupled to the second network.

12. The method of claim 9, wherein the manifest data includes a set of requirements a developer needs to meet while developing the package.

13. The method of claim 9, further comprising comparing a first file size associated with the manifest data to a second file size associated with the package.

14. The method of claim 9, further comprising comparing a first list of files associated with the manifest data to a second list of files associated with the package.

15. The method of claim 9, further comprising comparing a first time stamp associated with the manifest data to a second time stamp associated with the package.

16. The method of claim 9, wherein the code injection comprises a malicious code injection.

17. A non-transitory computer readable media comprising code embodied in a tangible medium to perform the steps of:
    identifying manifest data associated with an executable software package to be developed on a package development system;
    receiving the executable software package from the package development system via a first network;

comparing the manifest data to the executable software package to determine whether a code injection exists in the executable software package;

selecting a combination of a plurality of comparisons based on a level of risk associated with at least one of the importance of the executable software package, an amount of user systems subscribed to the executable software package, and a type of user systems subscribed to the executable software package; and distributing the executable software package to a plurality of user systems via a second network based on a determination that the code injection does not exist in the package.

\* \* \* \* \*